United States Patent [19]

Björshol

[11] 4,455,778

[45] Jun. 26, 1984

[54] SYSTEM FOR HANDLING OF FISHING GEARS

[76] Inventor: Kolbjörn Björshol, N-6560 Langøyneset, Norway

[21] Appl. No.: 355,739

[22] PCT Filed: Jul. 6, 1981

[86] PCT No.: PCT/NO81/00029

§ 371 Date: Mar. 1, 1982

§ 102(e) Date: Mar. 1, 1982

[87] PCT Pub. No.: WO82/00078

PCT Pub. Date: Jan. 21, 1982

[30] Foreign Application Priority Data

Jul. 7, 1980 [NO] Norway ............................ 802040

[51] Int. Cl.³ .............................................. A01K 73/06
[52] U.S. Cl. .......................................... 43/8; 414/140
[58] Field of Search ............ 43/8; 114/255; 254/336; 414/140

[56] References Cited

U.S. PATENT DOCUMENTS

| 2,875,547 | 3/1959 | Puretic | 43/8 |
| 3,535,811 | 10/1970 | Demmert | 43/8 |
| 3,882,627 | 5/1975 | Takamura | 43/8 |

FOREIGN PATENT DOCUMENTS

| 1357963 | 3/1964 | France. | |
| 37225 | 5/1964 | German Democratic Rep. | 114/255 |
| 66375 | 1/1968 | German Democratic Rep. | 414/140 |
| 55-36124 | 3/1980 | Japan | 114/255 |
| 724964 | 2/1955 | United Kingdom | 414/140 |
| 379448 | 4/1973 | U.S.S.R. | 43/8 |

Primary Examiner—Nicholas P. Godici
Assistant Examiner—P. Weston Musselman, Jr.
Attorney, Agent, or Firm—Watson, Cole, Grindle & Watson

[57] ABSTRACT

A system for the transfer of a net formed fishing gear to a bin (2) aboard a vessel (1), which in association with a pull means (5) comprises a guide means (6) which is adapted to perform a swinging movement in mutually different planes relatively to the pull means.

8 Claims, 4 Drawing Figures

SYSTEM FOR HANDLING OF FISHING GEARS

BACKGROUND OF THE INVENTION

The present invention relates to a system for handling fishing gears, viz. the transfer of a net formed fishing gear into a bin aboard a vessel, and is particularly intended fore use aboard pod or purse seine vessels in which it is of importance that a gear, such as a seine which is to be hauled after use, may be cleared for new setting as quickly and simply as possible.

In connection with fishing gears which are provided with loads along one edge, the ground, and with floats, cork, along the other edge, it is of importance that the gear, during setting, be orderly disposed in the gear bin, with the ground along one side of the vessel and the cork on the other. It is now usual that the gear is drawn by means of a winch at one side of the vessel, is then passed over in highly positioned pull roller arranged at the end of a boom and thence downwardly into a bin in which the crew is used to place the gear in order, a task which is both heavy and cumbersome, as the gear is arriving at a relatively high speed and may be very heavy.

SUMMARY OF THE INVENTION

The present invention relates to a system of the type which comprises a winch for the hauling of the net and a highly positioned pull roller for the transfer of the net into the bin and the purpose of the invention is to avoid the heavy manual labour thereby that the pull means for the gear is associated with a guide means and means adapted to cause the net positioning means to perform swinging movements in mutually different planes. In such a system, the gear may be placed in orderly turns in the bin, so that it may be set without thereby forming tangles or disorder.

The system according to the invention preferably is in the form of a tube, which may possibly be telescopic, and which is adapted to cooperate with jack means which are adapted to cause the tube to perform swinging movements for the guidance of the positioning of the gear in the bin.

Further features of the system according to the invention will appear from the claims and from the following description of an embodiment of a system applied to a pod or purse seine vessel.

DETAILED DESCRIPTION OF THE PREFERRED EMBODIMENT

Figure 1:
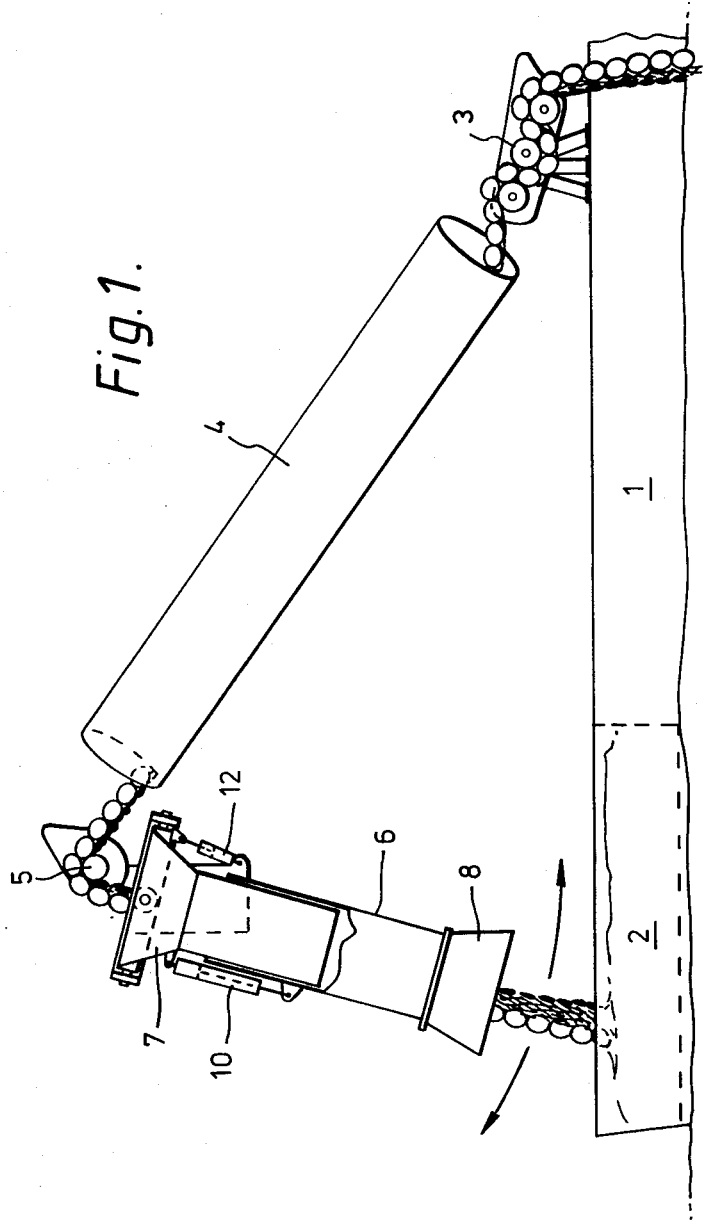
FIG. 1 is a side view of the system.
Figure 2:
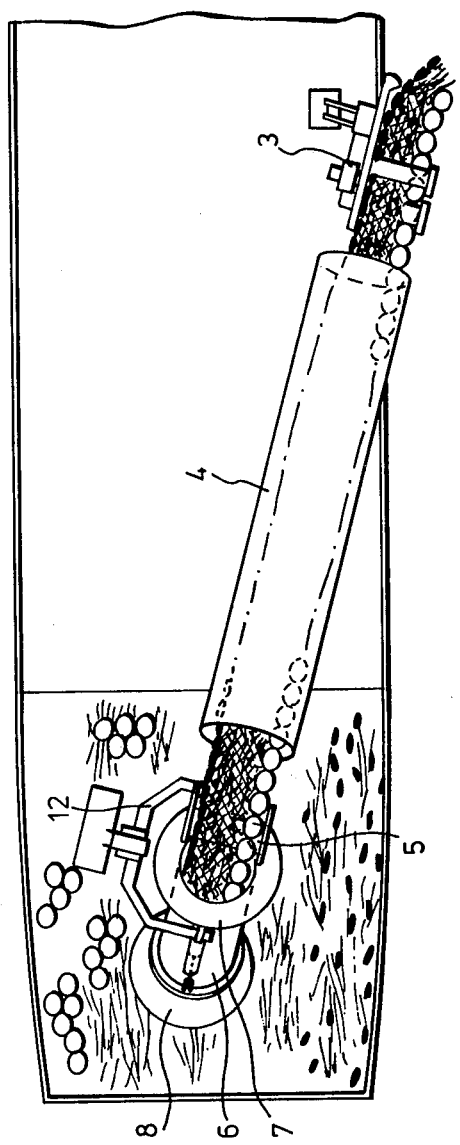
FIG. 2 is a top view of the system.
Figure 3:
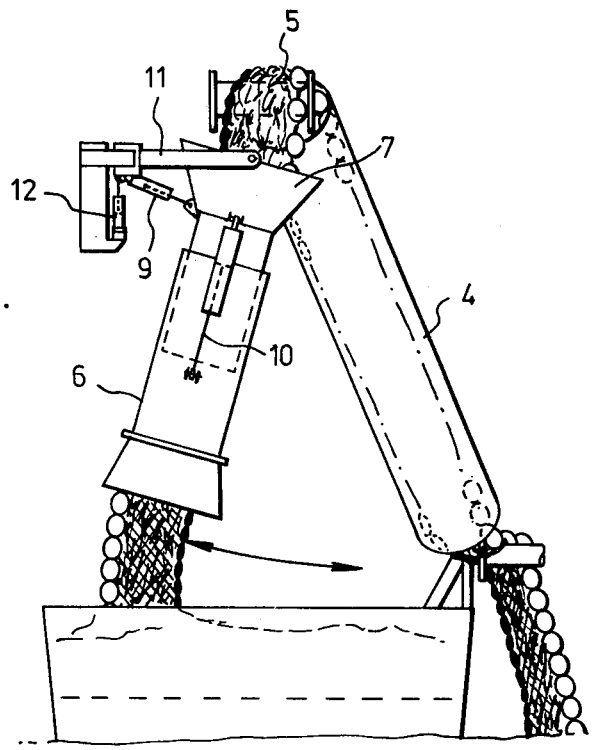
FIG. 3 is a view of the system as seen from the left in FIG. 1, i.e., in the fore and aft direction of the vessel.

In the drawing, 1 is the aft portion of a fishing vessel, in which a bin 2 is arranged for the reception of a net which may be hauled in by means of a winch 3 at the side of the vessel and carried through a tube 4 over a pull unit 5 positioned at a high point aboard, for instance at a boom end and then to the bin 2. The seine is to be set out from the bin 2.

Figure 4:
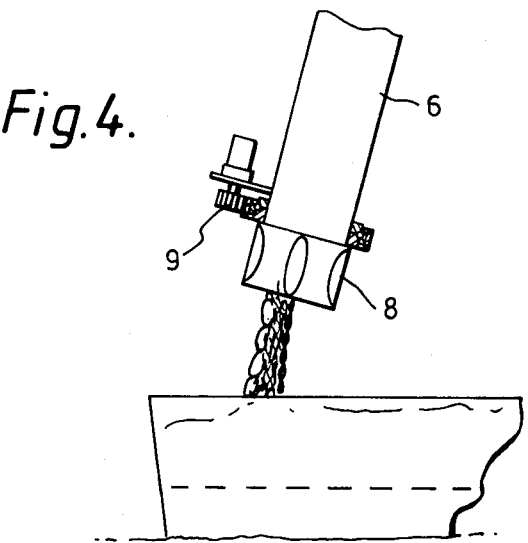
FIG. 4 is a side view of a detail of the system.

According to the invention, the pull unit 5 is associated with a guide means extending between the unit 5 and the bin 2 and made in the form of a tube 6 which may be made monolitic, in one piece, or, as shown, telescopic for adaption to the distance between the unit 5 and the various points, athwartship and alongship, wherein the net is to be placed, and to the amount of net accomodated in the bin 2. The tube 6 is provided with an inlet collar 7 and an outlet nozzle 8 which, possibly, may be provided with means 9, FIG. 4, adapted to twist the net so as to facillitate the positioning of the net in the bin 2.

For the purpose of varying the length of the tube 6 and the swinging of the same in athwartship and alongship directions during the hauling of the net and the placing of the same in the bin 2, the tube 6 is associated with means, in the form of jacks, as shown hydraulic piston-cylinder means 10, 11 and 12, which in step effect setting of the tube length and swinging of the tube so that the net is placed in the bin 2 with the ground at the same side of the vessel as the winch 3 and the cork at the opposite side, so that the bin is utilized to the most and the subsequent giving out of the net may be performed without difficulties.

In the embodiment shown, the nozzle 8 is positioned at the outlet of the tube 6. However, it may prove advantageous to position the means for twisting the gear at an earlier point during the advance of the gear, for instance along the length of the tube 6, or even in the guide tube 4.

I claim:

1. A system for the guided positioning of a net-type fishing gear in a bin aboard a vessel, said system including a winch for hauling in the net-type fishing gear; a pull roller located at an elevated position with respect to the winch; an elongated guide means extending downwardly from a point below the pull roller toward the bin; and means connected to the elongated guide means to cause it to swing relative to the pull roller in mutually angularly displaced planes; the net-type fishing gear being hauled in by the winch and caused to pass over the pull roller, after which it slides down the elongated guide means substantially along the longitudinal axis thereof and is placed in the bin aboard the vessel.

2. The system as defined in claim 1 wherein the elongated guide means is in the form of a chute.

3. The system as defined in claim 2 wherein the chute comprises a tube.

4. The system as defined in claim 3 wherein the tube is formed of multiple sections which can be telescopingly moved relative to one another along the axis of the tube.

5. The system as defined in claim 3 wherein the tube defines an upper end located nearest the pull roller and a lower end located nearest the bin aboard the vessel, and wherein an outlet means is connected to the lower end of the tube which is rotatable about the axis of the tube.

6. The system as defined in claim 1 wherein the means connected to the elongated guide means to cause it to swing include hydraulic piston-cylinder jacks.

7. In a vessel which includes a bin for the storage of a net-type fishing gear, a winch for hauling in the net-type fishing gear, and a pull roller located at an elevated position with respect to the winch, the improvement wherein an elongated guide means is positioned to extend downwardly from a point below the pull roller toward the bin, the net-type fishing gear sliding down the elongated guide means substantially along the longitudinal axis thereof after passing over the pull roller, and means connected to the elongated guide means to cause it to swing relative to the pull roller in mutually angularly displaced planes.

8. A vessel as defined in claim 7 wherein the elongated guide means comprises a tube.

* * * * *